United States Patent

[11] 3,599,701

[72] Inventors: Bengt Olof Pontus Mollerstedt; Karl Gunnar Stig Johansson, both of Ljungaverk, Sweden
[21] Appl. No.: 748,755
[22] Filed: July 30, 1968
[45] Patented: Aug. 17, 1971
[73] Assignee: Kema Nord AB, Stockholm, Sweden

[54] CRYSTALLIZATION METHOD
10 Claims, 2 Drawing Figs.

[52] U.S. Cl. ................................ 159/47, 159/16, 159/45, 23/273, 23/295
[51] Int. Cl. ............................ B01d 1/100, F26b 7/100
[50] Field of Search .......................... 159/16, 16 A, 45, 47; 23/273, 295, 301

[56] References Cited
UNITED STATES PATENTS

| | | | |
|---|---|---|---|
| 2,424,206 | 7/1947 | Otto | 23/119 |
| 2,409,790 | 10/1946 | Otto | 23/273 |
| 2,424,207 | 7/1947 | Otto | 23/119 |
| 2,614,035 | 10/1952 | Robinson | 23/302 |
| 2,801,907 | 8/1967 | Scott | 23/273 X |

Primary Examiner—Norman Yudkoff
Assistant Examiner—J. Sofer
Attorney—Fred C. Philpitt ABSTRACT: This invention generally relates to a method for continuous crystallization of water soluble compounds by means of which rounded or spherical crystals are obtained and good regulation of the size and the size distribution of the crystals is achieved. The method is particularly suitable for crystallization from aqueous solutions substantially free from impurities.

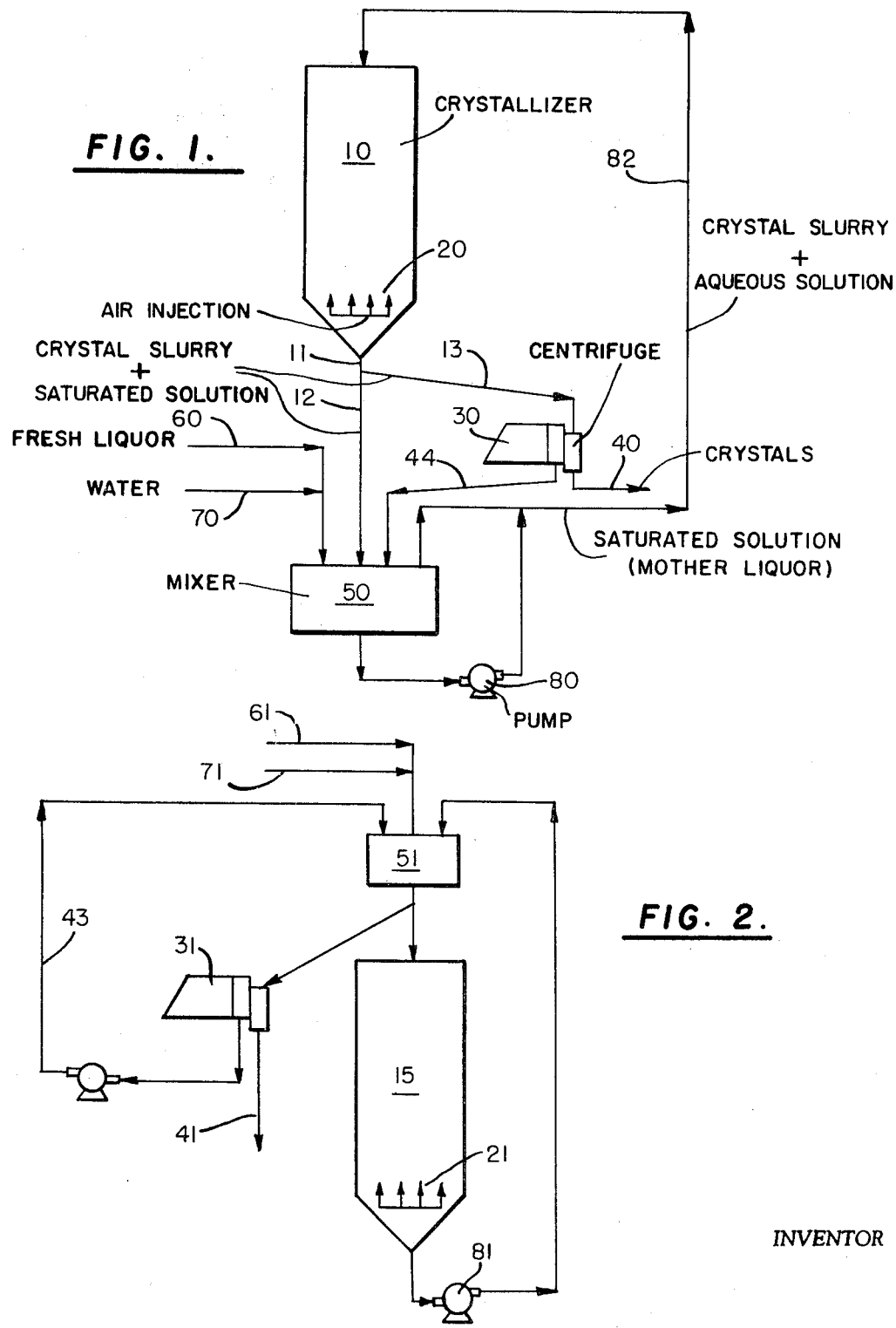

CRYSTALLIZATION METHOD

THE INVENTION BROADLY

The method of the present invention can be considered as comprising the following main steps:

I. introducing into a crystallizing zone an aqueous crystal slurry (i.e. a suspension of crystals of the water-soluble compound in its saturated water solution) freed from crystalline nuclei and small crystals;

II. maintaining the temperature of the crystal slurry (prior to introduction into the crystallization zone) equal to or slightly higher than the temperature in the crystallizer;

III. injecting air into the slurry in the crystallizing zone so as to concentrate the slurry and so as to create enough turbulence in the crystallization zone so that considerable classification is prevented and so that all areas of the crystallization zone have a substantially uniform composition;

IV. removing slurry from the crystallization zone and returning at least 50 percent of this removed slurry back to the crystallization zone (after being freed from crystalline nuclei and small crystals by means of adding water).

The feed to the crystallizing zone is obtained by mixing a crystal slurry with water and maintaining its temperature equal to or slightly higher than the temperature in the crystallizer. Crystalline nuclei and small crystals are thereby dissolved but the concentration of the mother liquor is not subject to any considerable change. The formation of supersaturated solutions is thus avoided.

As the crystallization zone is charged with a slurry containing only relatively large crystals, the crystallization will take place mainly as a growth of these crystals, the formation of small crystals being restrained to the growth of new nuclei formed in the crystallizer.

The efficient and thorough mixing in the crystallization zone prevents the solution from becoming supersaturated within said zone and causes crystallization to take place at the saturation curve (within the metastable crystallization range) where the creation of crystalline nuclei is retarded and the growth mainly occurs on already formed crystals. Moreover, the vigorous agitation of the slurry in the crystallization zone (which is considerably stronger than that which would exist in a vacuum crystallizer or in a classifying crystallizer) causes a generally uniform growth of the crystals along all three axes rather than on preferred crystal faces. In addition, the mechanical impact between crystals caused by the turbulent motion contributes to the formation of crystals having a substantially spherical form.

The amount of water should be adjusted so that the larger crystals in the slurry do not dissolve at all or only to a minor extent, while the more soluble crystal nuclei and small crystals with a particle size of preferably up to 5 m$\mu$ are dissolved. The proportion of particles within this particular size range varies with the nature of the crystallizing compound and with the operating conditions, but normally the proportion is within the range of 2—20 percent and only exceptionally up to 40 percent. In actual operation this percentage can easily be determined experimentally and is used in calculating the amount of water which has to be added.

The addition of water to the crystal slurry can be carried out in a mixing tank provided with an agitator and with a steam coil or other means for supplying heat in order to keep the temperature constantly on the same level or only a little higher than in the crystallizer. The volume of the mixing tank should be large enough to give a resident time of the slurry which is sufficient in order to obtain equilibrium conditions.

Into the mixing tank there is preferably also introduced (a) the mother liquor recovered from the apparatus employed for separating the crystals from the slurry (e.g. a centrifuge) and (b) original fresh liquor from which the crystals are to be produced. Both these introduced liquors should be substantially free from crystals and have about the temperature prevailing in the crystallizer and/or in the mixing tank. The fresh liquor should be saturated or almost saturated in which latter case the water addition to the mixing tank is adjusted with regard to the ability of the fresh liquor to dissolve further crystals. The water can be added separately or together with any of the liquors fed to the mixing tank.

The slurry obtained in the mixing tank, which is thus freed from crystalline nuclei, is returned to the crystallizer. The system can be operated in various ways, as is illustrated in FIGS. 1 and 2, which are schematic flow diagrams.

In both the illustrated alternatives water is added into a mixing tank. The water thus added as well as the water introduced to the system with the fresh liquor is evaporated from the crystallizer by means of air injection so that the slurry withdrawn from the crystallizer always keeps as constant a total concentration as possible. The regulating means are the air volume, the air temperature, and/or the air moisture content. However, the air volume always should be large enough to maintain a vigorous turbulent motion within the slurry in the crystallizer. According to a specific embodiment, which in a simple way enables maintaining an automatically regulated constancy of the crystallization process, a constant air quantity is injected, said quantity being determined approximately to correspond to the amount of water to be added and evaporated; minor variations of temperature of the air injected and of its moisture content as well as of other operation conditions are compensated by regulating the water addition. The regulating device can be continuously controlled by means of a concentration meter in the crystallizer or in the outlet of same. This concentration meter analyses the slurry with respect to either the total concentration (crystals plus solute) or to the crystal content in the slurry. If the operation conditions do not show great variations, discontinuous concentration measurements on samples from the crystallizer are sufficient guidance for this regulation, which in such a case can be done manually.

In order to obtain crystals of large and uniform diameter, the crystal content in the slurry leaving the crystallizer should not be less than 10 percent and preferably more than 20 percent since the crystals are thereby given a large growth surface which can catch the nuclei and thereby assist in retarding the formation of discrete fine particles.

The system illustrated in FIG. 1 shows that the total slurry formed in the mixing tank is recirculated to the crystallizer but that the slurry withdrawn from the crystallizer is separated into two portions, the ratio of these portions being 1:1—1:9 respectively. The smaller portion is fed to the centrifuge for the separation of the crystals while the larger portion is fed to the mixing tank.

More particularly, FIG. 1 illustrates one arrangement for carrying out the present invention, wherein 10 is the crystallizer tank having a cylindrical shape and a conical bottom, and 20 is a distributor for the introduction of air. Concentrated crystal slurry is removed from tank 10 through line 11, whereafter the crystal slurry is divided, a portion passing into conduit 12 and the remaining portion passing into conduit 13. The portion passing through conduit 13 goes into a centrifuge 30, the crystals exiting through line 40 and the liquor passing through conduit 44 to mixing tank 50. The portion withdrawn from tank 10 through conduit 12 also passes to mixing tank 50. Mixing tank 50 also is provided with inlet 60 for the introduction of fresh liquor and an inlet 70 for the introduction of water. A pump 80 is provided for removing a slurry from the bottom of tank 50 and passing it to the top of tank 10.

The following example indicates how the system of FIG. 1 is employed in the production of ammonium nitrate crystals.

EXAMPLE

With reference to FIG. 1, 10 tons of a slurry was contained in crystallizer tank 10, said slurry being at a temperature of 77° C. and having a total nitrate content (crystals plus dissolved salt) of 92 percent. 2,900 m.³/hr. of air was injected into the crystallizer tank by means of the distributor 20. Air leaving the crystallizer had a dew point of 54° C.

From the bottom of the crystallizer tank 10 a slurry was continually drawn off (at the rate of 24 tons per hour) through line 11, whereafter 75 percent of the slurry was passed through line 12 and 25 percent was passed through line 13. The slurry passing through line 13 went to the centrifuge 30, where ammonium nitrate crystals were separated at the rate of 2 tons per hour, such crystals having a moisture content of <0.5 percent. The mother liquor from the centrifuge was conducted through line 44 to the mixing tank 50.

The slurry passing downwardly through line 12 entered the mixing tank 50. About 2.3 tons per hour of a 86 percent nitrate solution from a saturation unit (where nitric acid was neutralized with ammonia) was introduced into the mixing tank through line 60. The mixing tank 50 was provided with a steam coil (not shown) so as to maintain the temperature within the range of 78°—79° C. About 50—100 kg./hr. of water was also simultaneously and continuously introduced into the mixing tank 50. The addition of water was controlled by means of a concentration meter (not shown) arranged in the outlet of the crystallizer, so that the total nitrate content was held substantially constantly at 92 percent.

Because of the slight temperature elevation and the addition of water, about 0.6 tons/hour of nitrate crystals were dissolved in the mixing tank. This roughly corresponds to 10 percent of the quantity introduced from the crystallizer. The slurry in the mixer, having a total nitrate content of 90—90.5 percent was passed from the mixer 50 to the crystallizer 10 by means of pump 80 and line 82.

The aforementioned temperature of 77 ° C. in the crystallizer 10 is automatically fixed by the given operating conditions (air quantity, etc.). By changing these conditions, the process can be carried out at a different temperature. However, in the manufacture of ammonium nitrate, it is desirable to obtain the crystal modification III which means that the temperature in the crystallizer and other parts of the system should not exceed about 84° C.

The above example is based on the crystallization of ammonium nitrate on an industrial scale. This same method has also been successfully employed for other chemical compounds such as ammonium sulfate, sodium nitrate and mixtures of ammonium nitrate and sodium nitrate. Accordingly, the invention is not limited to ammonium nitrate, for the primary reason for using ammonium nitrate in the example was because of the particularly great difficulties in producing nitrate crystals in spherical form and uniform size are generally known.

FIG. 2 illustrates an alternative embodiment wherein the slurry withdrawn from the mixing tank 51 is divided into two portions in the ratio of 1:1 to 1:9. The smaller of said fractions is fed to the centrifuge 31 for separation of the crystals which exit through line 41 (and the liquor which is returned through line 43 to tank 51). The larger fraction is fed to the crystallizer 15. Crystallizer 15 has a distributor 21 for the introduction of air and a pump 81 moves slurry from the bottom of crystallizer 15 to the mixing zone 51. Fresh liquor entering through line 61 and fresh water entering through line 71 can be introduced into mixing tank 51. As compared with the system shown in FIG. 1, it has been found that the system shown in FIG. 2 gives a somewhat further reduced grain size distribution, and the final crystal product is almost completely free of fines.

What we claim is:

1. A method for the continuous crystallization of water soluble compounds for producing large crystals of uniform size, which comprises:
   a. providing a slurry of crystals in a saturated aqueous solution;
   b. mixing said slurry with water in a mixing zone so that between about 2 and 40 percent of the crystals are dissolved, and that substantially all of the crystals of a size below 6 m$\mu$ are dissolved;
   c. feeding at least 50 percent of the mixture of said slurry and water to a crystallizing zone;
   d. injecting air into the slurry in the crystallizing zone so as to concentrate the slurry by evaporating the water and so as to create enough turbulence in the crystallization zone that considerable classification is prevented and that all areas of the crystallization have a substantially uniform composition;
   e. removing a concentrated crystal slurry from the lower part of the crystallization zone;
   f. returning to said mixing zone not less than 50 percent of the concentrated crystal slurry withdrawn from the crystallization zone, and
   g. separating crystals from the remaining slurry portion.

2. A method according to claim 1 wherein the amount of air injected in the crystallizing zone is maintained constant and the amount of water is controlled so that the slurry in the crystallizing zone has a constant concentration.

3. A method according to claim 1, wherein the concentrated crystal slurry withdrawn from the crystallizing zone is divided into two portions in the ratio of about 1:1—1:9, the larger portion being returned to the process where it is mixed with water and the smaller portion being transferred to a separation zone for the separation of the large crystals, from whence the substantially crystal free mother liquor is returned to the process for mixing with a crystal slurry.

4. A method according to claim 1 wherein the temperature of the slurry of crystals prior to introduction into the crystallization zone is equal to or slightly higher than the temperature in the crystallizer.

5. A method according to claim 1, wherein the concentrated crystal slurry withdrawn from the crystallizing zone is mixed with water and then divided into two portions in the ratio of about 1:1 —1:9, the larger portion being returned to the crystallizing zone and the smaller portion being transferred to a separating zone for the separation of crystals, from whence the substantially crystal-free mother liquor is returned to the process for mixing with a crystal slurry.

6. A method according to claim 1, wherein between about 2 and 20 percent of the crystals are dissolved by mixing said slurry with water in a mixing zone.

7. A method according to claim 1, wherein the crystal content in the slurry which is removed from the crystallization zone is at least 10 percent.

8. A method according to claim 1, wherein the crystal content in the slurry which is removed from the crystallization zone is more than 20 percent.

9. A method according to claim 1, wherein the water is added as a nonsaturated aqueous solution of the crystallizing compound.

10. A method according to claim 9, wherein the amount of air injected in the crystallizing zone is maintained constant and the amount of water added is controlled so that the slurry in the crystallizing zone has a constant concentration.